United States Patent [19]

Furukawa et al.

[11] 4,436,873

[45] Mar. 13, 1984

[54] CONJUGATED DIENE BLOCK POLYMER AND PROCESS FOR PREPARING THE SAME

[75] Inventors: Hiroshi Furukawa, Kobe; Yuichi Saito, Nishinomiya; Akio Imai; Keisaku Yamamoto, both of Ichihara; Hiroyoshi Takao, Chiba; Nobuyuki Yoshida, Ichihara, all of Japan

[73] Assignee: Sumitomo Chemical Co., Ltd., Osaka, Japan

[21] Appl. No.: 477,583

[22] Filed: Mar. 21, 1983

Related U.S. Application Data

[63] Continuation of Ser. No. 324,545, Nov. 24, 1981, abandoned.

[30] Foreign Application Priority Data

Nov. 27, 1980 [JP] Japan ............................ 55-167836

[51] Int. Cl.³ ............................................ C08F 297/02
[52] U.S. Cl. .................................... 525/314; 526/335
[58] Field of Search ............ 525/314; 526/337, 340.4, 526/335

[56] References Cited

U.S. PATENT DOCUMENTS 4,091,051  5/1978  Moczygemba ...................... 525/314
4,107,236  8/1978  Naylor ................................ 525/314
4,294,942  10/1981  Henderson .......................... 525/314

Primary Examiner—Paul R. Michl
Attorney, Agent, or Firm—Armstrong, Nikaido, Marmelstein & Kubovcik

[57] ABSTRACT

A conjugated diene block polymer composed of blocks having a different microstructure from each other such that one block contains 20 to 60% by mole of 1,2- and/or 3,4-bonding, the other block contains 50 to 90% by mole of 1,2- and/or 3,4-bonding, the difference in the 1,2- and/or 3,4-bonding content between the both blocks is from 20 to 50% mole and the average content of 1,2- and/or 3,4-bonding in the polymer is from 50 to 85% by mole. The block polymer has a high wet skid resistance and a low dynamic heat generating property, and is very useful as a material for automobile tires.

4 Claims, No Drawings

CONJUGATED DIENE BLOCK POLYMER AND PROCESS FOR PREPARING THE SAME

This application is a continuation of application Ser. No. 324,545, filed Nov. 24, 1981, now abandoned.

BACKGROUND OF THE INVENTION

The present invention relates to a conjugated diene block polymer, and more particularly a block polymer of a conjugated diene compound composed of blocks where the modes of microstructure are different from each other.

Hitherto, many kinds of conjugated diene polymers are known, and in particular, isoprene polymers and butadiene polymers prepared by using the so-called Ziegler catalyst and butadiene polymers prepared by using an organolithium catalyst have been used as synthetic rubbers for various purposes. These polymers are characterized by their modes of microstructure. In general, it is known that they are polymers having a high cis content or a high cis and trans content. These polymers, particularly in case of applying to the use as tires for automobiles, have a feature that dynamic heat generation is a little. However, they have a drawback that the braking characteristics which are another important performance required in tires are bad, and in particular are remarkably lacking in the wet skid resistance which indicates the braking characteristic on a wet road. In order to cover up the drawback, there has been adopted, for instance, a manner using a rubber blend in which a styrene-butadiene rubber is incorporated in a suitable proportion. This manner improves the wet skid resistance, but increases the dynamic heat generation, thus resulting in increase of the rolling resistance of tires. It is the present condition in this industry that a rubber composition indicating such unsatisfactory characteristics is employed.

On the other hand, in recent years, it has been found, as disclosed in Japanese Patent Publication No. 20771/1973, that a rubber composition containing a conjugated diene polymer having a high content of 1,2-bonding provides a product having characteristic mechanical properties such as high impact resilience, high breaking strength and excellent low temperature resistance. Such a rubber composition is suitable as a material for tires of passenger cars, etc. In particular, it is expected that a rubber composition containing a polybutadiene having a high 1,2-bonding content would provide an excellent material for tires in that both characteristics of the wet skid resistance and the dynamic heat generation could be improved together. However, no reports on the influences of the polymer structure such as the content or distribution of such 1,2-bonding in a polymer have been made, and the optimization thereof has been demanded. In the present age where improvement of the braking characteristics or the wet skid resistance is demanded, particularly for ensuring safety with development of a superhighway system, and on the other hand, reduction of the dynamic heat generation or rolling resistance of tires is demanded due to a rise of energy cost, it is a very important subject to improve the both characteristics together.

SUMMARY OF THE INVENTION

It has now been found that a conjugated diene block polymer composed of blocks, of which the microstructures are different from each other, can provide a material for tires having both a high wet skid resistance and a low rolling resistance.

In accordance with the present invention, there is provided a block polymer of a conjugated diene, having a Mooney viscosity of 20 to 120 at 121° C. and consisting essentially of blocks (A) and (B) defined by the following conditions (1) to (4);

(1) the block (A) of which the content of 1,2- and/or 3,4-bonding is from 20 to 60% by mole, (2) the block (B) of which the content of 1,2- and/or 3,4-bonding is from 50 to 90% by mole, (3) the difference in the 1,2- and 3,4-bonding content between the block (A) and the block (B) is from 20 to 50% by mole, and (4) the average content of 1,2- and/or 3,4-bonding in the block polymer consisting essentially of the blocks (A) and (B) is from 50 to 85% by mole.

DETAILED DESCRIPTION

The block polymer of the present invention is, for instance, prepared by a process using an organic alkali metal compound as an polymerization initiator which has been known as a living anionic polymerization process. Particularly, a process using an organolithium compound as an initiator, a Lewis basic compound such as an ether or a tertiary amine as an agent for controlling the content of the 1,2- and/or 3,4-bonding, and an inert hydrocarbon as a polymerization solvent is preferred from the viewpoint of stability in polymerization and easiness in controlling the 1,2- and/or 3,4-bonding content.

The regulation of the molecular weight of the polymer, namely the Mooney viscosity of the polymer, can be attained by adjusting the proportion of the monomer and initiator used. The amount of the initiator necessary for obtaining the polymer having a Mooney viscosity of 20 to 120 is from 0.005 to 15% by mole based on the monomer used. When the Mooney viscosity of the polymer is less than 20, the polymer is poor in storability and processability because the so-called cold flowability and the strength are low, and moreover the dynamic heat generation is large and accordingly the polymer is unsuitable as a material for tires in practical use. When the Mooney viscosity of the polymer is more than 120, the polymer is unsuitable for practical use, because supply of the polymer to a processing machine is difficult and also the compoundability and dispersibility of various other additives added upon the preparation of tires are bad.

The content of the 1,2-bonding and/or 3,4-bonding in the polymer can be regulated by the adjustment of the proportion of the employed Lewis basic compound and polymerization initiator or the adjustment of the polymerization temperature. The 1,2- and/or 3,4-bonding content increases with the increase of the amount of the Lewis basic compound and the lowering of the polymerization temperature.

In one of preferable embodiments, the polymer of the present invention is prepared as follows: To an inert hydrocarbon solvent are added a monomer and a polymerization initiator in amounts capable of producing a polymer having a prescribed Mooney viscosity which falls within the range of 20 to 120 and a Lewis basic compound in an amount ($l_1$) capable of providing a prescribed content ($X_1$% by mole) of the 1,2- and/or 3,4-bonding which falls within the range of 20 to 60% by mole. The polymerization is carried out at a prescribed temperature ($T_1$) to form the block (A). To the polymerization system is then added the Lewis basic compound in an amount $(l_2-l_1)$ in which $l_2$ is the amount capable of providing a prescribed 1,2- and/or 3,4-bonding content [$X_2$% by mole, provided that $X_2$ is between $(X_1+20)$ and $(X_1+50)$] which falls within the range of 50 to 90% by mole. The polymerization is continued at the above temperature $(T_1)$ to form the block (B). In that case, the opportunity for the second addition of the Lewis basic compound in an amount $(l_2-l_1)$ is determined as follows: That is to say, the second addition of the Lewis basic compound is suitably conducted within the period during which the average 1,2- and/or 3,4-bonding content ($X_{av}$% by mole) in the polymer as a whole, which is shown by the equation (I):

$$X_{av}=[X_1\times r_1+X_2\times(100-r_1)]/100 \quad (I)$$

wherein $r_1$ is a conversion (% by mole) of a monomer at the time of the second addition of the Lewis basic compound, falls within the range of 50 to 85% by mole.

The following process is also exemplified as another embodiment of a process for preparing the polymer of the present invention. In this process, to an inert hydrocarbon solvent are first added a monomer and a polymerization initiator in amounts capable of producing a polymer having a prescribed Mooney viscosity which falls within the range of 20 to 120 and a Lewis basic compound in an amount $(l_2)$ capable of providing a prescribed content ($X_2$% by mole) of the 1,2- and/or 3,4-bonding which falls within the range of 50 to 90% by mole. The polymerization is carried out at a prescribed temperature $(T_1)$ to form the block (B). The temperature of the polymerization system is then rapidly elevated to a temperature $(T_2)$ at which the 1,2- and/or 3,4-bonding can be formed in the presence of the Lewis basic compound of the above amount $(l_2)$ so that the 1,2- and/or 3,4-bonding content becomes a prescribed value [$X_1$% by mole, provided that $X_1$ is between $(X_2-50)$ and $(X_2-20)$] which falls within the range of 20 to 60% by mole. The polymerization is continued at that temperature to form the block (A). The opportunity for the rapid temperature elevation is determined as follows: That is to say, the temperature elevation is suitably conducted within the period during which the average 1,2- and/or 3,4-bonding content ($X_{av}$% by mole) in the polymer as a whole, which is shown by the equation (II):

$$X_{av}=[X_2\times r_1+X_1\times(100-r_1)]/100 \quad (II)$$

wherein $r_1$ is a conversion (% by mole) of a monomer at the time just before the temperature elevation, falls within the range of 50 to 85% by mole. In the present invention, the polymer of the invention can also be prepared in a combined manner of the adjustment of the amount of the Lewis basic compound and the adjustment of the polymerization temperature.

The block polymerization for obtaining the polymer of the present invention may be carried out by a batchwise operation or a continuous operation. In case of conducting the polymerization by a continuous operation, a multiple vessel continuous polymerization apparatus in which two or more agitating vessels are connected or a tubular reaction apparatus is preferably employed in point of controlling the structure of the produced polymer.

The time for the reaction generally falls within the range of 1 minute to 3 hours in a continuous process, and 10 minutes to 20 hours in a batch process. The polymerization process of the present invention can be carried out at any temperature within the range of 30° to 200° C., but it is preferred to operate in the range of 30° to 100° C. as to $T_1$, and 50° to 200° C. as to $T_2$. When the elevating temperature process is adopted, the temperature difference between $T_1$ and $T_2$ generally falls within the range of 20° to 100° C.

It is necessary that the average content of the 1,2-bonding and/or 3,4-bonding in the block polymer as a whole is from 50 to 85% by mole. When the average content is less than 50% by mole, the wet skid resistance is lowered, and the use of such a polymer cannot attain the objects of the invention. Also, the preparation of a block polymer containing more than 85% by mole of 1,2- and/or 3,4-bonding requires the use of a very large amount of a Lewis basic compound. This results in difficulty in controlling the 1,2- and/or 3,4-bonding content and the Mooney viscosity, because the polymerization reaction becomes unstable.

It is also necessary that the difference in the 1,2- and/or 3,4-bonding content between the block (A) and the block (B) is from 20 to 50% by mole. When the difference is less than 20% by mole, the effect of improving the wet skid resistance is small and the polymer has no sufficient characteristics desired. On the other hand, in case of preparing the block polymer in which the difference is more than 50% by mole, the amount of the Lewis basic compound to be additionally added must be remarkably increased, or the temperature difference in the rapid temperature elevation must be remarkably increased. Consequently, it becomes difficult to control the polymerization, and this results in difficulty in controlling the 1,2- and/or 3,4-bonding content and the Mooney viscosity.

Like this, the polymer of the present invention is one obtained by severely controlling the content of 1,2- and/or 3,4-bonding in the respective blocks (A) and (B), the difference in the content of the above microbonding between the both blocks and the average content of the above microbonding, and can improve the both characteristics of the dynamic heat generation and the wet skid resistance together. Such a specific polymer of the present invention has never hitherto been provided, despite that various polymers prepared by the so-called living anionic polymerization process have been known.

Examples of the conjugated diene used for preparing the block polymer of the present invention are 1,3-butadiene, isoprene, 1,3-pentadiene, substituted butadienes such as 2,3-dimethyl-1,3-butadiene and 1-phenyl-1,3-butadiene, substituted 1,3-pentadienes, and the like. These conjugated dienes may be employed alone or in admixture thereof. Particularly, 1,3-butadiene or isoprene is preferably employed, because of easiness in obtaining the monomer and large polymerization rate. For instance, when 1,3-butadiene is employed as a monomer, the produced polymer contains the 1,2-bonding units, and when isoprene is employed as a monomer, the produced polymer contains the 1,2-bonding units and-/or 3,4-bonding units.

In the preparation of the polymer of the present invention, preferably a hydrocarbon is employed as an inert polymerization solvent or diluent from the viewpoint of control of the polymerization reaction. Examples of the hydrocarbon used as a solvent or diluent are aromatic hydrocarbons such as benzene, toluene, xylene and ethylbenzene, aliphatic hydrocarbons such as hexane and heptane, alicyclic hydrocarbons such as cyclopentane, cyclohexane and methylcyclohexane, and the like. These hydrocarbons may be employed alone or in admixture thereof. The hydrocarbon is employed preferably in an amount of 1 to 20 parts by weight per part by weight of the whole monomer or monomers used. In the present invention, it is necessary to previously, sufficiently remove substances which destroy the polymerization initiator and the active ends, e.g. water, oxygen, carbon dioxide, certain kinds of sulfur compounds, and acetylene compounds, from the hydrocarbon used as a polymerization medium and the monomer.

Preferable organolithium compounds used as polymerization initiators in the present invention are those known usually as anionic polymerization initiators of one end initiation type or both ends initiation type. Representative examples of the initiator are ethyllithium, propyllithium, butyllithium, amyllithium, trimethylenedilithium, tetramethylenedilithium, hexyllithium, cyclohexyllithium, phenyllithium, tolyllithium, naphthyllithium, other organolithium compounds of condensed or noncondensed aromatic rings, oligobutadienyldilithium and oligoisobutylenyldilithium which are in the living state, and the like. These organolithium compounds may be employed alone or in admixture thereof.

Ether compounds and tertiary amines are preferably employed as Lewis basic compounds because of being easily obtainable, though various kinds of compounds can be employed. Examples of the ether compound are cyclic ethers such as tetrahydrofuran, tetrahydropyran and 1,4-dioxane, aliphatic monoethers such as diethyl ether and dibutyl ether, aliphatic polyethers such as ethyleneglycol dimethyl ether, ethyleneglycol dibutyl ether, diethyleneglycol dimethyl ether, diethyleneglycol diethyl ether and diethyleneglycol dibutyl ether, aromatic ethers such as diphenyl ether and anisole, and the like. Examples of the tertiary amine are triethylamine, tripropylamine, tributylamine, N,N,N',N'-tetramethylethylenediamine, N-dimethylaniline, pyridine, quinoline, and the like.

The amount of the Lewis basic compound varies depending on its kind and the polymerization temperature, and is difficult to absolutely specify. In general, the Lewis basic compound is preferably employed in an amount of 0.01 to 100 moles per mole of the organolithium compound upon forming the block (A) and in an amount of 1 to 500 moles per mole of the organolithium compound upon forming the block (B).

The polymer prepared by the processes as mentioned above is usually obtained in the form of solution or suspension in the polymerization solvent or diluent. The polymer is separated and recovered in a usual manner, e.g. by pouring the reaction mixture to a poor solvent or a hot water.

The polymer of the present invention is processable by various machines usually employed for processing rubber-like polymers. Also, the polymer of the invention can be admixed with usual additives such as carbon black, sulfur, a curing accelerator and an antioxidant to give a rubber composition, or with an extender to give an oil extended rubber composition. Further, the polymer of the invention can be cured under usual curing conditions to give a cured rubber.

The present invention is more specifically described and explained by means of the following Examples, in which all % are by mole and all parts are by weight unless otherwise noted. These Examples are intended to illustrate the invention and are not to be construed to limit the scope of the invention. Also, it is to be understood that various changes and modifications may be made in the invention without departing from the spirit and scope thereof.

EXAMPLE 1

The air in a 5 liter autoclave equipped with a stirrer and a jacket was replaced with nitrogen, and the autoclave was charged with 1.5 liters of purified, dried n-hexane, 15 g. of tetrahydrofuran and 3 millimoles of n-butyllithium dissolved in n-hexane. A hot water was circulated in the jacket to raise the temperature in the autoclave to 50° C. To the autoclave was added 400 g. of butadiene to start the polymerization. After conducting the polymerization at 50° C. for 40 minutes, about 5 ml. of the reaction mixture was taken out and was poured into methanol to precipitate a polymer. The polymer was dried by a hot press molding machine and weighed. The polymerization conversion was 32.6%. At this point of time, 85 g. of tetrahydrofuran was added to the autoclave by nitrogen pressure and the polymerization was further continued at 50° C. for 180 minutes. At this point of time, the polymer was recovered from a part of the reaction mixture and the polymerization conversion was measured. The conversion was 99.7%.

The 1,2-bonding contents in the polymers obtained at the time of the 32.6% conversion and the 99.7% conversion were 47.8% and 66.0%, respectively, which were determined by an infrared spectrophotometry. The 1,2-bonding content in a block formed after the 32.6% conversion was found to be 74.8% by calculation.

To the reaction mixture was added 10 ml. of methanol to terminate the polymerization. After adding 4 g. of 2,6-di-tert-butyl-4-methylphenol (commercially available under the registered trademark "Sumilizer BHT" made by Sumitomo Chemical Co., Ltd.) as an antioxidant, the reaction mixture was poured into hot water and n-hexane was distilled away. The precipitated polymer was dried under reduced pressure.

The physical properties of the polymer were measured. The results are shown in Table 1.

The measurement was made under the following conditions.

Mooney viscosity:

By employing a Mooney viscometer set at 121° C., a polymer was preheated for 1 minute, and after 4 minutes, the torque value was read. (ML, 1+4, 121° C.)

Wet skid resistance:

A polymer was compounded with 60 parts of carbon black, 20 parts of linseed oil, 5 parts of zink white, 2 parts of stearic acid, 2 parts of a curing accelerator and 1.6 parts of sulfur per 100 parts of the polymer, and was milled. The composition was press-cured to give a sheet having a thickness of 6.5 mm. The wet skid resistance was measured by employing the thus prepared sheet and a portable skid resistance tester made by Stanley. An asphalt surface to which water of 20° C. was sprayed was employed as a contact road surface.

Dynamic heat generation:

By employing the above-mentioned press-cured sheet and an automatic Goodrich flexometer, the measurement was made under conditions of 20 pounds in static loading, 1,800 c.p.m. in vibration, 75° C. in temperature and 0.2 inch in stroke. The temperature elevation after 14 minutes was recorded.

As is clear from Table 1, the block polymer of the present invention indicates excellent characteristics that the cured polymer has a high wet skid resistance and a small dynamic heat generating property.

EXAMPLE 2

The same autoclave as in Example 1 was charged with 1.5 liters of n-hexane, 2.5 g. of diethyleneglycol di-n-butyl ether and 3 millimoles of n-butyllithium. To the autoclave was added 400 g. of butadiene, and the polymerization was carried out at 50° C. for 70 minutes. At this point of time, the polymerization conversion was 61.3%. The temperature was then rapidly elevated by introducing steam of 100° C. into the jacket of the autoclave. After 10 minutes from starting of the introduction of steam, the temperature of the polymerization system rose to 83° C. The heat medium for the jacket was replaced by a hot water, and the polymerization was further continued for 130 minutes while maintaining the temperature of the system at 83° C. The final conversion was 98.6%. The produced polymer was recovered, dried and subjected to the measurement of the physical properties in the same manner as in Example 1.

The results are shown in Table 1.

COMPARATIVE EXAMPLE 1

The procedure of Example 1 was repeated except that 64 g. of tetrahydrofuran was added to the autoclave prior to starting the polymerization and the polymerization was carried out at 50° C. for 240 minutes without additional charge of tetrahydrofuran.

The results are shown in Table 1.

COMPARATIVE EXAMPLE 2

The procedure of Example 1 was repeated except that no tetrahydrofuran was employed.

The results are shown in Table 1.

It is clear from Table 1 that the block polymer of the present invention has an improved wet skid resistance, while having the same degree of low heat generating property as the polybutadiene having no block (Comparative Example 1) and the polybutadiene having a low content of 1,2-bonding (Comparative Example 2).

TABLE 1

| | Content of 1,2-bonding (%) | | | Mooney viscosity | | Heat generation |
| --- | --- | --- | --- | --- | --- | --- |
| | Average | Block (A) | Block (B) | ML1 + 4 (121° C.) | Wet skid resistance | (temp. rise, °C.) |
| EX. 1 | 66.0 | 47.8 | 74.8 | 58 | 63 | 24.7 |
| Ex. 2 | 64.5 | 50.5 | 73.2 | 71 | 62 | 23.9 |
| Com. Ex. 1 | 65.8 | — | — | 52 | 58 | 25.1 |
| Com. Ex. 2 | 11.3 | — | — | 69 | 43 | 23.7 |

In addition to the ingredients used in the Examples, other ingredients can be used in the Examples as set forth in the specification to obtain substantially the same results.

What we claim is:

1. A linear block polymer of a conjugated diene, having a Mooney viscosity of 20 to 120 at 121° C. and consisting essentially of blocks (A) and (B) defined by the following conditions (1) to (4);
   (1) the block (A) of which the content of 1,2- and/or 3,4-bonding is from 20 to 60% by mole,
   (2) the block (B) of which the content of 1,2- and/or 3,4-bonding is from 50 to 90% by mole,
   (3) the difference in the 1,2- and/or 3,4-bonding content between the block (A) and the block (B) is from 20 to 50% by mole, and
   (4) the average content of 1,2- and/or 3,4-bonding in the block polymer consisting essentially of the blocks (A) and (B) is from 50 to 85% by mole.

2. A process for preparing a linear block polymer which comprises polymerizing a conjugated diene in an inert hydrocarbon in the presence of 0.005 to 15% by mole, based on said conjugated diene, of an organolithium compound as a polymerization initiator and a Lewis basic compound to give a block polymer having a Mooney viscosity of 20 to 120 at 121° C. and consisting essentially of blocks (A) and (B) defined by the following conditions (1) to (4);
   (1) the block (A) of which the content of 1,2- and/or 3,4-bonding is from 20 to 60% by mole,
   (2) the block (B) of which the content of 1,2- and/or 3,4-bonding is from 50 to 90% by mole,
   (3) the difference in the 1,2- and/or 3,4-bonding content between the block (A) and the block (B) is from 20 to 50% by mole, and
   (4) the average content of 1,2- and/or 3,4-bonding in the block polymer is from 50 to 85% by mole.

3. The process of claim 2, wherein the polymerization is carried out in the presence of 0.1 to 100 moles of the Lewis basic compound per mole of the initiator to form the block (A) having the 1,2- and/or 3,4-bonding content $X_1$ within the range of 20 to 60% by mole, the Lewis basic compound is additionally added to the polymerization system so that the total amount thereof in the polymerization system falls within the range of 1 to 500 moles per mole of the initiator and the polymerization is continued at the same temperature to form the block (B) having the 1,2- and/or 3,4-bonding content $X_2$ within the range of 50 to 90% by mole, provided that the content $X_2$ is between $(X_1+20)$ and $(X_1+50)$, the additional addition of the Lewis basic compound being conducted within the period during which the average 1,2- and/or 3,4-bonding content $X_{av}$ shown by the equation (I):

$$X_{av}=[X_1\times r_1+X_2\times(100-r_1)]/100 \qquad (I)$$

wherein $r_1$ is a conversion of the conjugated diene at the time of the additional addition of the Lewis basic compound, falls within the range of 50 to 85% by mole.

4. The process of claim 2, wherein the polymerization is carried out in the presence of 1 to 500 moles of the Lewis basic compound per mole of the initiator to form the block (B) having the 1,2- and/or 3,4-bonding content $X_2$ within the range of 50 to 90% by mole, the temperature of the polymerization system is rapidly elevated and the polymerization is continued to form the block (A) having the 1,2- and/or 3,4-bonding content $X_1$ within the range of 20 to 60% by mole, provided that the content $X_1$ is between $(X_2-50)$ and $(X_2-20)$, the temperature elevation being conducted within the period during which the average 1,2- and/or 3,4-bonding content $X_{av}$ shown by the following equation (II):

$$X_{av}=[X_2\times r_1+X_1\times(100-r_1)]/100 \qquad (II)$$

wherein $r_1$ is a conversion of the conjugated diene at the time just before elevating the temperature, falls within the range of 50 to 85% by mole.

* * * * *

UNITED STATES PATENT AND TRADEMARK OFFICE
CERTIFICATE OF CORRECTION

PATENT NO. : 4,436,873
DATED : March 13, 1984
INVENTOR(S) : Hiroshi Furukawa et al.

It is certified that error appears in the above-identified patent and that said Letters Patent is hereby corrected as shown below:

On the title page item (73) should read

-- (73) Assignee. Sumitomo Rubber Industries, Ltd., Kobe,
and Sumitomo Chemical Co., Ltd., Osaka, Japan
part interest --.

Signed and Sealed this

Twenty-ninth Day of January 1985

[SEAL]

Attest:

DONALD J. QUIGG

Attesting Officer

Acting Commissioner of Patents and Trademarks